(12) United States Patent
Ozawa

(10) Patent No.: US 10,464,354 B2
(45) Date of Patent: Nov. 5, 2019

(54) PRINTER, METHOD OF CONTROLLING PRINTER, AND STORAGE MEDIUM

(71) Applicant: CASIO COMPUTER CO., LTD., Tokyo (JP)

(72) Inventor: Takeo Ozawa, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/919,982

(22) Filed: Mar. 13, 2018

(65) Prior Publication Data

US 2018/0264861 A1    Sep. 20, 2018

(30) Foreign Application Priority Data

Mar. 15, 2017    (JP) .................................. 2017-049958

(51) Int. Cl.
| | |
|---|---|
| *B41J 3/407* | (2006.01) |
| *B41J 2/32* | (2006.01) |
| *B41J 15/04* | (2006.01) |
| *G05B 13/02* | (2006.01) |
| *H02P 8/14* | (2006.01) |
| *H02P 8/38* | (2006.01) |
| *H02P 8/18* | (2006.01) |

(52) U.S. Cl.
CPC ............... *B41J 15/044* (2013.01); *B41J 2/32* (2013.01); *B41J 3/4075* (2013.01); *G05B 13/026* (2013.01); *H02P 8/14* (2013.01); *H02P 8/18* (2013.01); *H02P 8/38* (2013.01)

(58) Field of Classification Search
CPC .......... B41J 15/044; B41J 3/4075; B41J 2/32; H02P 8/18; H02P 8/38; H02P 8/14; G05B 13/026
See application file for complete search history.

(56) References Cited

U.S. PATENT DOCUMENTS

| | | | | |
|---|---|---|---|---|
| 6,144,184 A | * | 11/2000 | Yamaguchi | ............... H02P 8/14 318/135 |
| 6,963,415 B1 | * | 11/2005 | Saito | ........................ B41J 11/42 318/696 |
| 2018/0152126 A1 | * | 5/2018 | Nito | ......................... H02P 8/14 |

FOREIGN PATENT DOCUMENTS

| | | |
|---|---|---|
| GB | 2 313 499 A | 11/1997 |
| JP | H8-18737 A | 1/1996 |
| JP | H9-313000 A | 12/1997 |
| JP | 2005-59521 A | 3/2005 |
| JP | 2006-211879 A | 8/2006 |

* cited by examiner

*Primary Examiner* — Scott A Richmond
(74) *Attorney, Agent, or Firm* — Chen Yoshimura LLP

(57) ABSTRACT

A printer includes a processor; a conveying motor that can operate in any one of a plurality of excitation modes, the conveying motor being configured to convey a printing medium; and a printhead that prints on the printing medium on the basis of printing data, wherein, with respect to each of at least some of the plurality of excitation modes, the processor estimates a strength value of a vibration that would be caused by said conveying motor when the conveying motor is operated in said excitation mode at a first conveying speed that is set based on the print data, and selects one of the plurality of excitation modes for actually operating the conveying motor based on the estimated strength values of the vibrations for the at least some of the plurality of excitation modes.

10 Claims, 9 Drawing Sheets

PRINTER, METHOD OF CONTROLLING PRINTER, AND STORAGE MEDIUM

BACKGROUND OF THE INVENTION

The present invention relates to a printer, a method of controlling the printer, and a storage medium.

DESCRIPTION OF THE RELATED ART

One type of conventionally well-known printers prints on a printing medium one printing line at a time (on a per-printing line basis) by controlling current passing through a plurality of heating elements arranged on a thermal head while conveying the printing medium using a stepping motor.

One well-known technology for such printers is variable-division printing, in which each printing line is printed a prescribed number of times (printing count) determined on a per-printing line basis. When this printing count is greater than one, the time required for printing is longer than when the printing count is equal to one, which means that the printing medium must be conveyed at a relatively low speed and therefore that the stepping motor must be rotated at a relatively low speed. Typically, rotating the stepping motor at a relatively low speed in this manner results in an increase in vibration in the stepping motor in comparison to when the stepping motor is rotated at a relatively high speed. This vibration makes resonance more likely to occur, and this resonance in turn makes noise or "step-out" more likely to occur. Moreover, to address this problem of resonance in stepping motors, technologies for delaying excitation switching (phase switching) timings have been disclosed (see Japanese Patent Application Laid-Open Publication No. 2005-59521, for example).

However, when the excitation switching timings are delayed in this manner in order to avoid the effects of resonance in the stepping motor, the printing medium conveying speed (that is, the printing speed) is less than a desired speed set equal to the optimal speed (fastest speed).

SUMMARY OF THE INVENTION

In light of the foregoing, one aspect of the present invention aims to provide a printer, a method of controlling the printer, and a storage medium which make it possible to avoid the effects of resonance in a conveying motor while also suppressing any decrease in printing speed relative to a desired value.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a printer, including: a processor; a conveying motor that can operate in any one of a plurality of excitation modes, the conveying motor being configured to convey a printing medium; and a printhead that prints on the printing medium on the basis of printing data, wherein, with respect to each of at least some of the plurality of excitation modes, the processor estimates a strength value of a vibration that would be caused by the conveying motor when the conveying motor is operated in the excitation mode at a first conveying speed that is set based on the print data, and selects one of the plurality of excitation modes for actually operating the conveying motor based on the estimated strength values of the vibrations for the at least some of the plurality of excitation modes.

In another aspect, the present disclosure provides a method of controlling a printer performed by a processor in the printer, the printer including the processor; ga conveying motor that can operate in any one of a plurality of excitation modes, the conveying motor being configured to convey a printing medium; and a printhead that prints on the printing medium on the basis of printing data, the method including: with respect to each of at least some of the plurality of excitation modes, estimating a strength value of a vibration that would be caused by the conveying motor when the conveying motor is operated in the excitation mode at a first conveying speed that is set based on the print data; and selecting one of the plurality of excitation modes for actually operating the conveying motor based on the estimated strength values of the vibrations for the at least some of the plurality of excitation modes.

In another aspect, the present disclosure provides a non-transitory computer-readable storage medium having stored thereon a program executable by a processor in a printer that includes the processor; a conveying motor that can operate in any one of a plurality of excitation modes, the conveying motor being configured to convey a printing medium; and a printhead that prints on the printing medium on the basis of printing data, the program causing the processor to execute the following: with respect to each of at least some of the plurality of excitation modes, estimating a strength value of a vibration that would be caused by the conveying motor when the conveying motor is operated in the excitation mode at a first conveying speed that is set based on the print data; and selecting one of the plurality of excitation modes for actually operating the conveying motor based on the estimated strength values of the vibrations for the at least some of the plurality of excitation modes.

It is to be understood that both the foregoing general description and the following detailed description are exemplary and explanatory, and are intended to provide further explanation of the invention as claimed.

DETAILED DESCRIPTION OF THE INVENTION

Next, a printer, a method of controlling the printer, and a program according to an embodiment of the present invention will be described with reference to figures.

Figure 1:
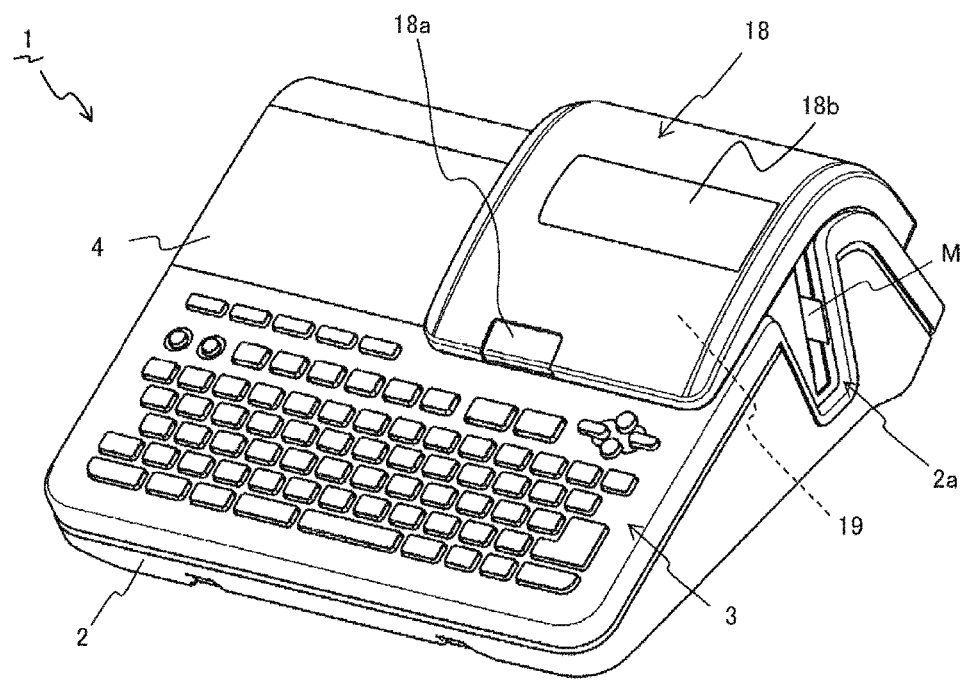
FIG. 1 is a perspective view illustrating a printer according to an embodiment.

FIG. 1 is a perspective view illustrating a printer 1 according to the embodiment.

Figure 2:
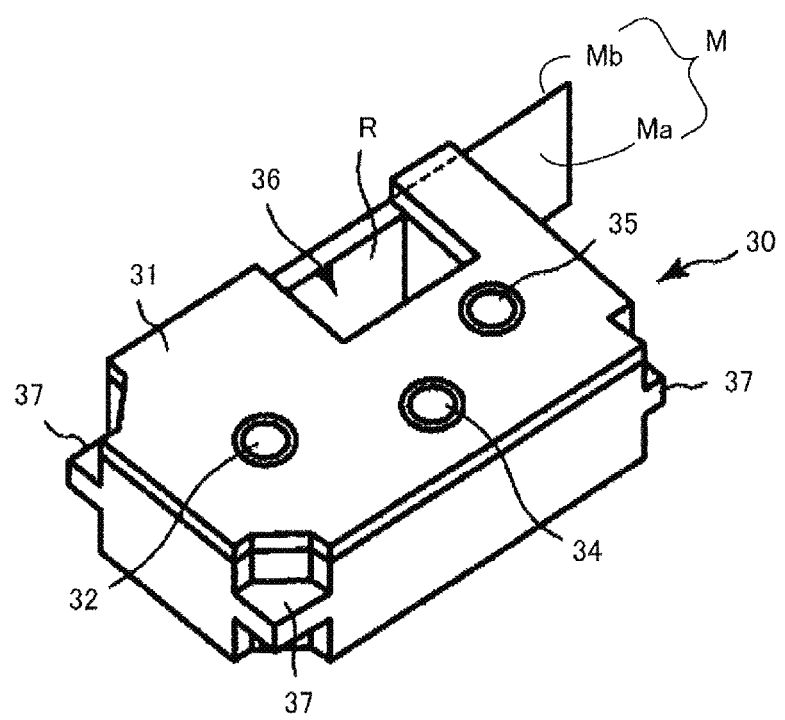
FIG. 2 is a perspective view illustrating a cassette housed in the printer according to the embodiment.

The printer 1 is a device for printing on an elongated printing medium M and here is a label printer including a thermal head (an example of a printhead). Although the following description describes a thermal transfer label printer which uses an ink ribbon as an example, the printing scheme and the shape of the printing medium M are not particularly limited. For example, a printing scheme which involves printing on thermal paper may be used. As illustrated in FIG. 2, the printing medium M is a tape including a base material Ma which has an adhesive layer, and a release paper Mb which is peelably adhered to the base material Ma so as to cover the adhesive layer, for example. The printing medium M may also be constituted by a single member (such as the base material Ma) which does not have release paper.

As illustrated in FIG. 1, the printer 1 includes a housing 2, an input unit 3, a display unit 4, an opening/closing lid 18, and a cassette compartment 19. The input unit 3, the display unit 4, and the opening/closing lid 18 are arranged on the top surface of the housing 2. Moreover, the housing 2 includes various components that are not illustrated in the figure, such as a power cord connection terminal, an external device connection terminal, and a storage media insertion port.

The input unit 3 includes various keys such as input keys, directional keys, conversion keys, and an enter key. The display unit 4 is a liquid crystal display panel, for example, and displays text and the like corresponding to input from the input unit 3, selection menus for various settings, messages related to various processes, and the like. Moreover, during printing, the display unit 4 displays the content (hereinafter, "printing content") such as text and graphics which was specified to be printed on the printing medium M and may also display the progress of the printing process. Furthermore, the display unit 4 may include a touch panel unit, in which case, the display unit 4 may be regarded as being part of the input unit 3.

The opening/closing lid 18 is arranged above the cassette compartment 19 and covers the cassette compartment 19 in an openable/closable manner. The opening/closing lid 18 can be opened by pressing a button 18a. A window 18b is formed in the opening/closing lid 18 in order to make it possible to visually check whether a cassette 30 (see FIG. 2) is currently housed in the cassette compartment 19 even when the opening/closing lid 18 is closed. Moreover, a feedout port 2a is formed in the side face of the housing 2. The printing medium M that is printed on inside of the printer 1 is fed to outside of the device via this feedout port 2a.

FIG. 2 is a perspective view illustrating the cassette 30 housed in the printer 1.

Figure 3:
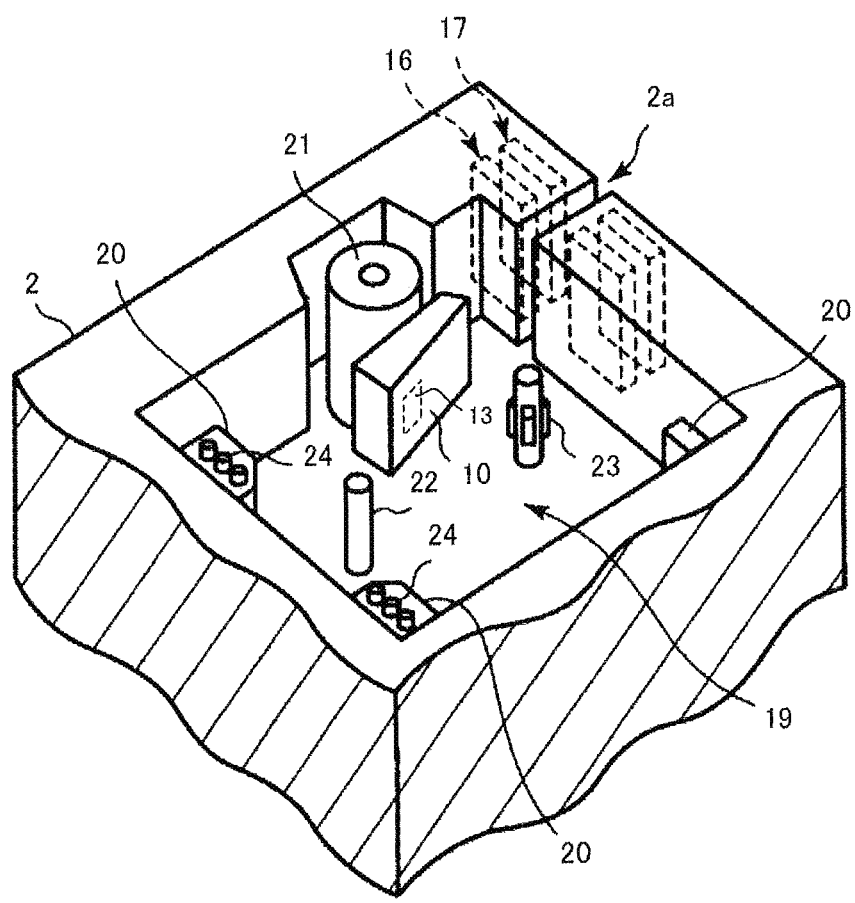
FIG. 3 is a perspective view illustrating a cassette compartment in the printer according to the embodiment.

FIG. 3 is a perspective view illustrating the cassette compartment 19 in the printer 1.

Figure 4:
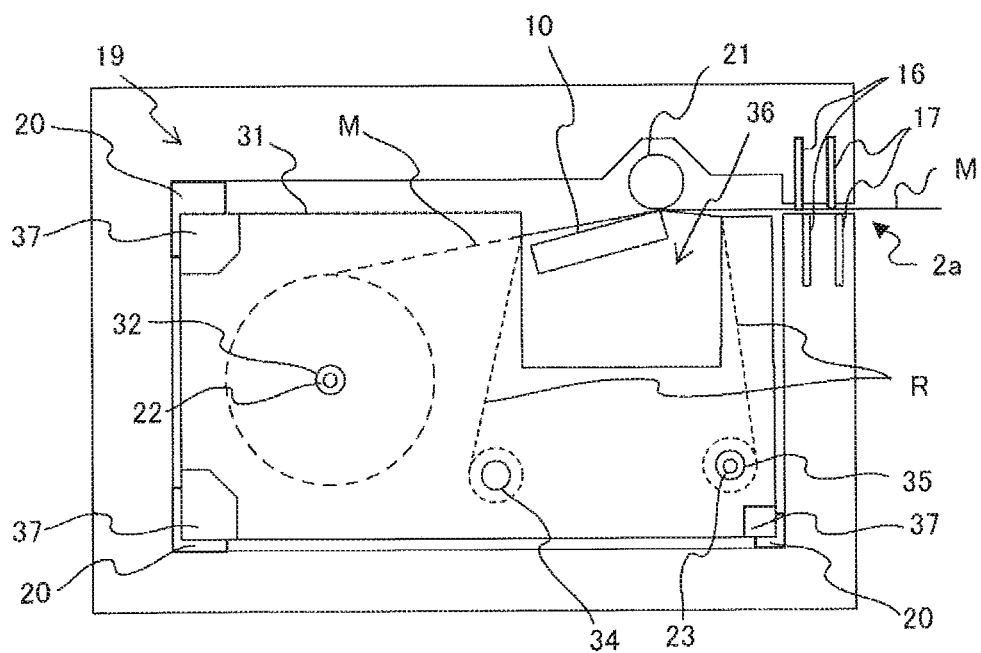
FIG. 4 is a cross-sectional view illustrating the cassette compartment in the printer according to the embodiment.

FIG. 4 is a cross-sectional view illustrating the cassette compartment 19 in the printer 1.

The cassette 30 illustrated in FIG. 2 stores the printing medium M and is removably housed within the cassette compartment 19 illustrated in FIG. 3. FIG. 4 depicts a state in which the cassette 30 is currently housed within the cassette compartment 19. As illustrated in FIG. 2, the cassette 30 includes a cassette case 31 which stores the printing medium M and an ink ribbon R and in which a thermal head insertion portion 36 and engagement portions 37 are formed.

Furthermore, the cassette case 31 includes a tape core 32, an ink ribbon supply core 34, and an ink ribbon winding core 35. The printing medium M is wound in a roll around the tape core 32 inside of the cassette case 31. Moreover, the thermal transfer ink ribbon R is wound in a roll around the ink ribbon supply core 34 inside of the cassette case 31, with the leading end being wound around the ink ribbon winding core 35.

As illustrated in FIG. 3, a plurality of cassette-receiving portions 20 for supporting the cassette 30 at prescribed positions are formed inside of the cassette compartment 19 in the housing 2. Moreover, tape width detection switches 24 (an example of a width detection mechanism for detecting the width of the printing medium M) are provided on the cassette-receiving portions 20. The cassette compartment 19 can selectively house any of various types of cassettes 30 having printing mediums M of different widths, and therefore the tape width detection switches 24 detect the width of the printing medium M on the basis of the shape of the cassette 30 (that is, the shape of the protrusions and recesses formed in the cassette 30) and output a sensor signal indicating the detected width of the printing medium M.

Furthermore, a thermal head 10 (an example of a printhead) which prints on the printing medium M on the basis of data (hereinafter, "printing data") indicating the printing content to be formed on the printing medium M, a platen roller 21 which conveys the printing medium M, a tape core-engaging axle 22, and an ink ribbon winding driver axle 23 are arranged inside of the cassette compartment 19. In addition, thermistors 13 are embedded in the thermal head 10. The thermistors 13 are an example of measuring units which measure the temperature of the thermal head 10.

As illustrated in FIG. 4, when the cassette 30 is housed within the cassette compartment 19, the engagement portions 37 formed in the cassette case 31 are supported by the cassette-receiving portions 20 formed in the cassette compartment 19, and the thermal head 10 is inserted into the thermal head insertion portion 36 formed in the cassette case 31. Moreover, the tape core 32 of the cassette 30 is fitted onto the tape core-engaging axle 22, and the ink ribbon winding core 35 is fitted onto the ink ribbon winding driver axle 23.

Once a printing instruction is input to the printer 1, the printing medium M is drawn out from the tape core 32 by the rotation of the platen roller 21. Here, the ink ribbon winding driver axle 23 rotates in sync with the platen roller 21 so that the ink ribbon R is drawn out from the ink ribbon supply core 34 in unison with the printing medium M. In this way, the printing medium M and the ink ribbon R are conveyed along in an overlapping manner. Then, the thermal head 10 heats the ink ribbon R as it passes between the thermal head 10 and the platen roller 21 in order to transfer the ink onto the printing medium M and thereby print an image based on the printing data.

The used ink ribbon R that has passed between the thermal head 10 and the platen roller 21 is then wound around the ink ribbon winding core 35. Meanwhile, the printed printing medium M that has passed between the thermal head 10 and the platen roller 21 is cut by a full-cutting mechanism 16 and a half-cutting mechanism 17 (described later) and then fed out through the feedout port 2a.

Figure 5:
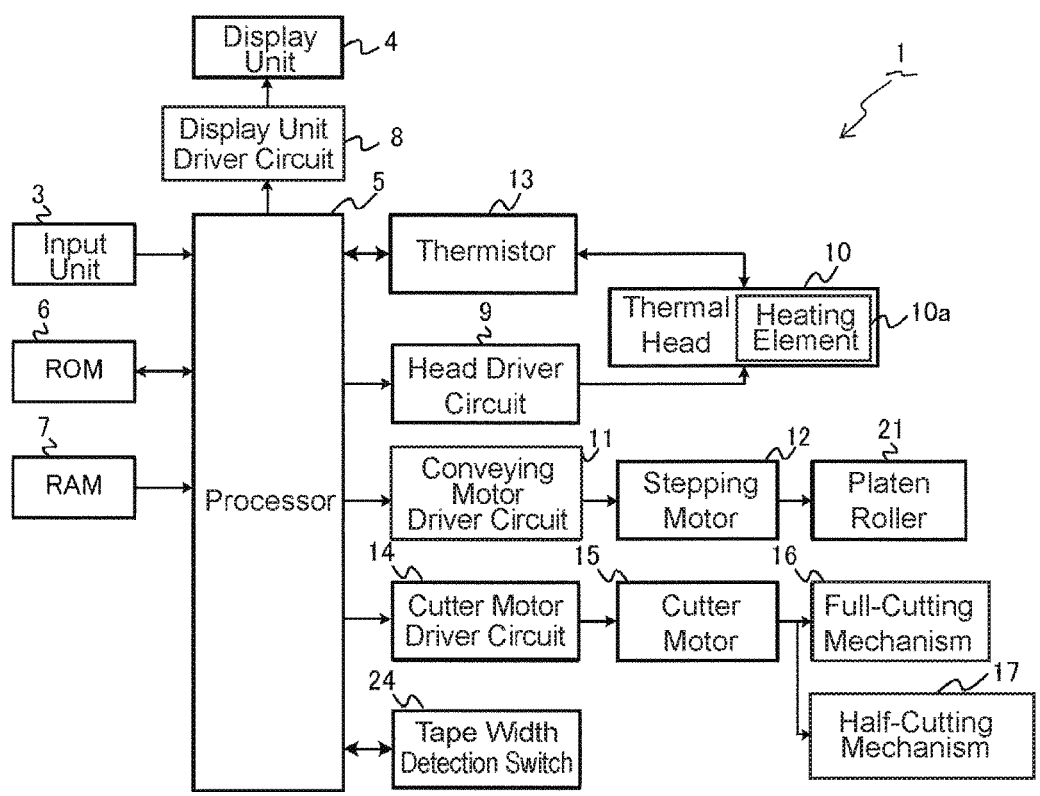
FIG. 5 is a control block diagram of the printer according to the embodiment.

FIG. 5 is a control block diagram of the printer 1.

The printer 1 includes, in addition to the input unit 3, the display unit 4, the thermal head 10, the full-cutting mechanism 16, the half-cutting mechanism 17, the platen roller 21, and the tape width detection switches 24 described above, a processor 5, a read-only memory (ROM) 6, a random-access memory (RAM) 7, a display unit driver circuit 8, a head driver circuit 9, a conveying motor driver circuit 11, a stepping motor 12, a cutter motor driver circuit 14, and a cutter motor 15. Here, the processor 5, the ROM 6, and the RAM 7 form a computer of the printer 1.

The processor 5 includes a central processing unit (CPU) or the like, for example. The processor 5 loads programs stored in the ROM 6 into the RAM 7 and then executes those programs in order to control the operation of the components of the printer 1. The processor 5 generates a strobe signal (a control signal) and printing data, for example, and supplies these to the head driver circuit 9. In this way, the processor 5 controls, via the head driver circuit 9, how current is passed through heating elements 10a of the thermal head 10. The processor 5 also controls the platen roller 21 via the conveying motor driver circuit 11 and the stepping motor 12. Furthermore, the processor 5 controls the full-cutting mechanism 16 and the half-cutting mechanism 17 via the cutter motor driver circuit 14 and the cutter motor 15.

The ROM 6 stores printing programs for printing on the printing medium M and various types of data needed to execute those printing programs (such as fonts and a current conduction table, for example). The ROM 6 also functions as a storage medium which stores programs readable by the processor 5.

The RAM 7 functions as an input data memory for storing information about printing (hereinafter, "printing information"). The RAM 7 also functions as a printing data memory for storing printing data generated on the basis of the printing information. Furthermore, the RAM 7 also functions as a display data memory for storing display data generated on the basis of the printing information. Note that the printer 1 may receive the printing information or the printing data from an external computer, in which case that receiver may be regarded as being the input unit.

The display unit driver circuit 8 controls the display unit 4 in accordance with the display data stored in the RAM 7. Under the control of the display unit driver circuit 8, the display unit 4 may display the printing content with the progress of the printing process also being displayed, for example.

The head driver circuit 9 drives the thermal head 10 on the basis of the strobe signal and the printing data supplied from the processor 5. More specifically, while the strobe signal is ON (hereinafter, the "conducting period"), the head driver circuit 9 enables or disables the flow of current to be supplied to the plurality of heating elements 10a of the thermal head 10 in accordance with the printing content. The thermal head 10 includes the plurality of heating elements 10a, which are arranged in the primary scanning direction (the width direction of the printing medium M). During the conducting period of the strobe signal supplied from the processor 5, the head driver circuit 9 selectively passes current to be supplied to the heating elements 10a in accordance with the printing data, thereby causing the heating elements 10a to generate heat and apply that heat to the ink ribbon R. In this way, the thermal head 10 prints printing lines on the printing medium M one at a time by means of thermal transfer.

The conveying motor driver circuit 11 drives the stepping motor 12. The stepping motor 12 drives the platen roller 21 and is an example of a conveying motor which operates in any of a plurality of excitation modes to convey the printing medium M. The platen roller 21 rotates using the power supplied by the stepping motor 12 in order to convey the printing medium M in the lengthwise direction of that printing medium M (secondary scanning direction; conveyance direction).

The cutter motor driver circuit 14 drives the cutter motor 15. The full-cutting mechanism 16 and the half-cutting mechanism 17 operate using the power supplied by the cutter motor 15 to make full cuts or half cuts in the printing medium M. Here, a "full cut" refers to cutting through both the base material Ma and the release paper Mb (see FIG. 2) of the printing medium M in the width direction, while a "half cut" refers to cutting through just the base material Ma in the width direction.

In the printer 1 configured as described above, an image based on the printing data to be printed on the printing medium M by the thermal head 10 is constituted by a plurality of printing lines which each extend in the direction orthogonal to the conveyance direction and are arranged adjacent to one another in that conveyance direction. Here, when printing one of the printing lines, if current is passed through all of the heating elements 10a of the thermal head 10 at once, a current of a relatively large magnitude flows through the thermal head 10, and the current capacity of the power adapter supplying that current may not always be sufficient.

Therefore, when printing one of the printing lines, if the number of the heating elements 10a through which current should be passed based on the printing data exceeds a prescribed number, the printer 1 divides the process of printing that printing line up into multiple operations so as to print the line in a time-divided manner. In other words, the processor 5 controls the thermal head 10 so as to print the printing line using a printing count corresponding to the number of printing dots included in that printing line. Furthermore, this printing count may be adjusted on the basis of the temperature of the thermal head 10. Here, a "printing line" refers to a line to be printed on the printing medium M. Moreover, "printing dots" refers to each of a plurality of dots constituting each printing line, where each printing dot corresponds to one of the heating elements 10a through which current is passed.

Utilizing this type of variable division printing scheme in which the printing count is changed in accordance with the number of printing dots makes it possible to set the printing speed (conveying speed) to the highest possible speed supported by the current capacity of the power adapter without increasing the current capacity of the power adapter. This also makes it possible to inhibit any decreases in print quality or deterioration in the durability of the thermal head 10 resulting from overheating of the thermal head 10.

The time required for printing is different when printing a printing line all at once (hereinafter, "one-time printing") and when printing a printing line multiple times in a time-divided manner (hereinafter, "divided printing"), with one-time printing making it possible to print each printing line in a shorter amount of time. Therefore, the printer 1 is configured to convey the printing medium M at a higher speed for one-time printing than for divided printing. More specifically, the printer 1 is configured to convey the printing medium M at different conveying speeds for different printing counts, for example.

The stepping motor 12 can be appropriately set to any of a plurality of excitation modes on a per-printing line basis, for example. Note that although the present embodiment describes using 2 phase excitation (2-2 phase excitation; an example of a first excitation mode) and 1-2 phase excitation (an example of a second excitation mode) as these excitation modes, the excitation modes are not particularly limited, and other excitation modes such as W1-2 phase excitation may also be used, for example. Moreover, in the printer 1, the processor 5 switches the excitation (switches the phase) of the stepping motor 12 via the conveying motor driver circuit 11 in order to drive the stepping motor 12 and thereby convey the printing medium M. In a given excitation mode, increasing the excitation switching frequency per printing line increases the amount of rotation of the stepping motor 12 per unit time and thereby increases the conveying speed. Here, "excitation switching" refers to switching the excitation phase of the motor within a particular excitation mode, which is different from changing the overall excitation mode itself.

Figure 6:
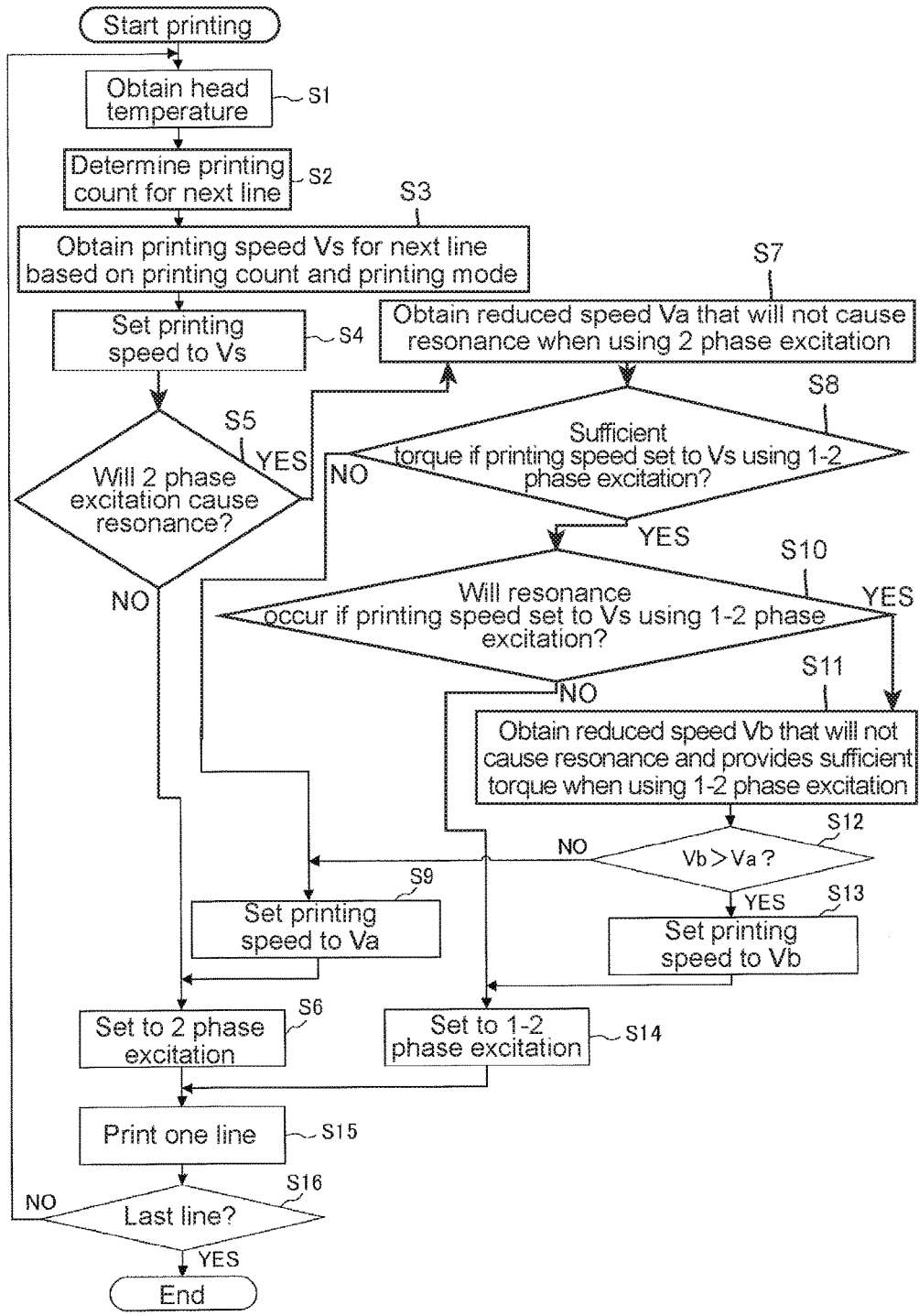
FIG. 6 is a flowchart for explaining a method of controlling the printer according to the embodiment.

FIG. 6 is a flowchart for explaining a method of controlling the printer 1.

Next, processes performed by the processor 5 will be described in detail with reference to FIG. 6. In the printer 1, when an instruction to start a printing process is received via the input unit 3, the processor 5 executes a printing program to start the printing control process illustrated in FIG. 6.

First, the processor 5 obtains the head temperature (that is, the temperature of the thermal head 10) from the thermistors 13 (step S1).

Next, the processor 5 obtains the printing data for the printing line to be printed next and determines a printing count on the basis of this printing data (step S2). Note that here, the printing count may also be adjusted on the basis of the head temperature. Moreover, if the printing count is two or greater, the processor 5 generates printing data for divided printing on the basis of the obtained printing data. As one example, the processor 5 references a prescribed table to get a count corresponding to the number of printing dots in the printing line and then determines that count as the printing count. Here, the printing count may be increased if the head temperature is lower than a prescribed temperature. The method of determining the printing count is not particularly limited. In addition, the timing at which the printing count is determined is not limited to being immediately before printing the target printing line (such as while printing the previous printing line), and printing counts for printing lines to be printed several lines later may be determined in advance.

Next, the processor 5 obtains a printing speed Vs for the next line (an example of a first conveying speed) on the basis of the determined printing count and a printing mode (step S3) and then sets the current printing speed to that printing speed Vs (step S4). Here, the printing modes include a quality-prioritized mode in which print quality is prioritized and a speed-prioritized mode in which printing speed is prioritized, for example, and the printing mode is set via the input unit 3 described above. As one example, the processor 5 references a prescribed table to get a printing speed corresponding to the printing count and the printing mode. Here, the printing speed Vs is set to be slower as the printing count becomes larger and is also set to be slower in quality-prioritized mode than in speed-prioritized mode. Moreover, the printing speed Vs may be set on the basis of just the printing count or may be set on the basis of conditions other than those described above.

Next, the processor 5 determines whether resonance will occur in the members constituting the stepping motor 12 when the conveying speed of the stepping motor 12 is set to the printing speed Vs using 2 phase excitation (step S5). As one example, the processor 5 can determine that resonance will occur if the strength value of vibration expected to occur in the stepping motor 12 while in that state is greater than or equal to some threshold value.

Figure 7:
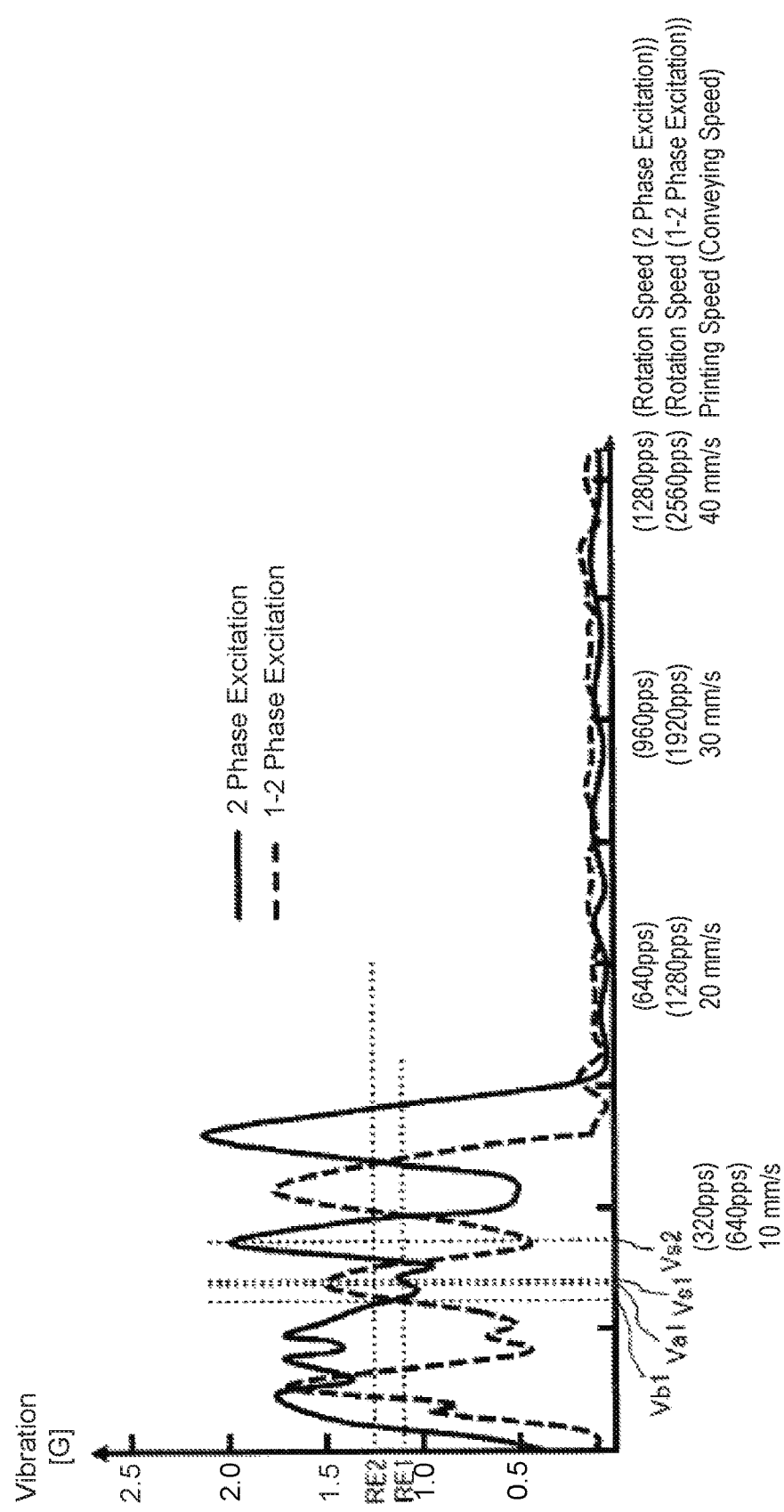
FIG. 7 is a graph showing the relationship between printing speed (conveying speed) and vibration strength value for several excitation modes.
Figure 8:
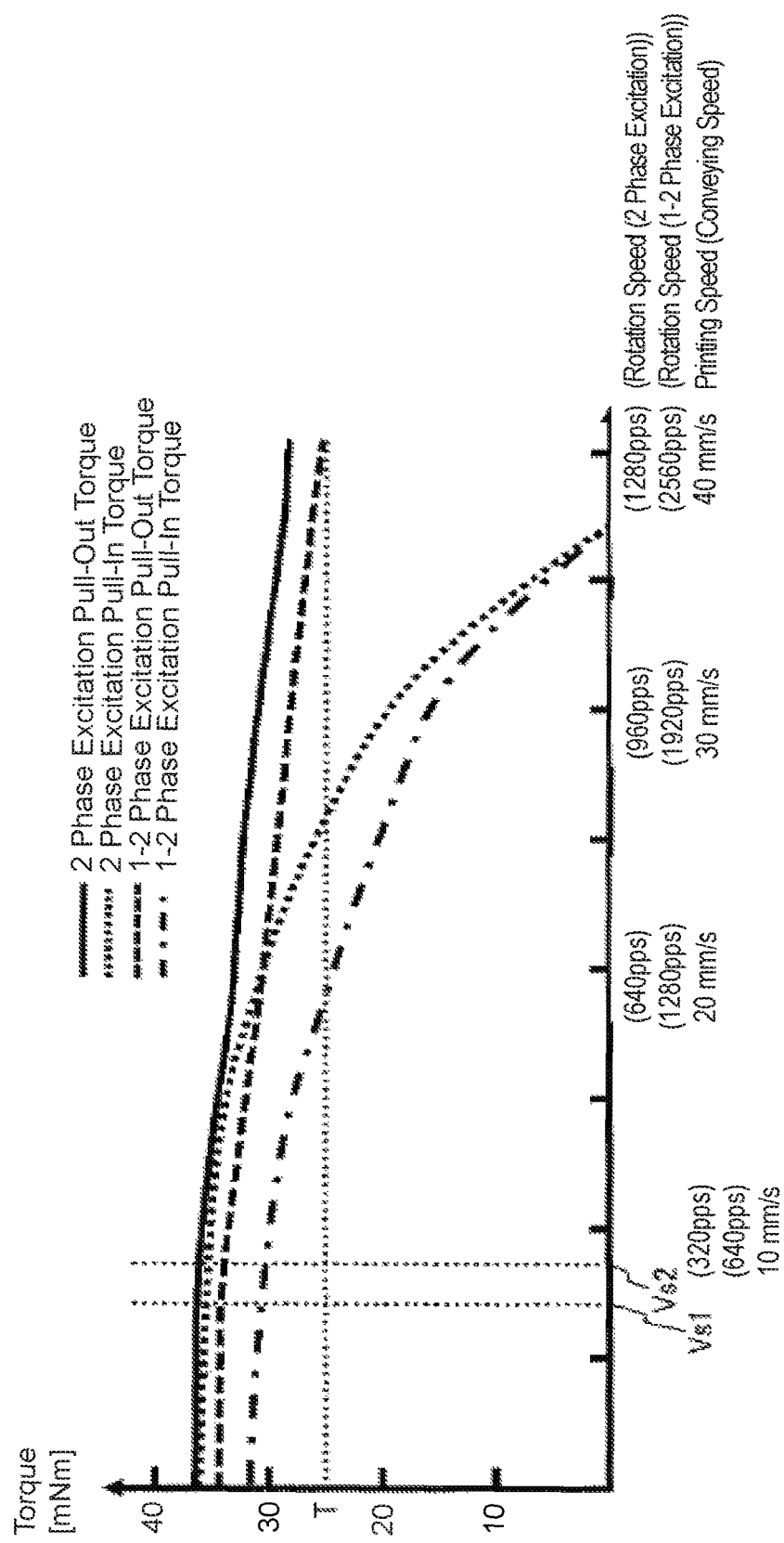
FIG. 8 is a graph showing the relationship between printing speed and torque for each excitation mode.

FIG. 7 is a graph showing the relationship between printing speed (conveying speed) and vibration strength value for each excitation mode, and FIG. 8 is a graph showing the relationship between printing speed and torque for each excitation mode. The data representing the relationship between printing speed (conveying speed) and vibration strength value for each excitation mode and the data representing the relationship between printing speed and torque for each excitation mode is obtained in advance via testing or the like and is stored in the ROM 6 in advance, for example. The graphs in FIGS. 7 and 8 are created by graphing this data stored in the ROM 6. As illustrated in FIG. 7, when the printing speed Vs is equal to a printing speed Vs1 (such as 7.0 mm/s) and the vibration strength threshold value (in gees) is equal to a threshold value RE1 (such as 1.1 G), the solid line corresponding to 2 phase excitation indicates that at that printing speed Vs1, the estimated vibration strength value exceeds the threshold value RE1. Therefore, the processor 5 determines that resonance will occur if the conveying speed of the stepping motor 12 is set to the printing speed Vs1 using 2 phase excitation (YES in step S5). Similarly, when the printing speed Vs is equal to a printing speed Vs2 (such as 8.75 mm/s) and the vibration strength threshold value is equal to a threshold value RE2 (such as 1.25 G), the estimated vibration strength value exceeds the threshold value RE2, and therefore the processor 5 determines that resonance will occur if the stepping motor 12 is set to that printing speed Vs2 using 2 phase excitation (YES in step S5).

Meanwhile, when the printing speed Vs is equal to the printing speed Vs1 and the vibration strength threshold value is equal to the threshold value RE2, the estimated vibration strength value is lower than the threshold value RE2, and therefore the processor 5 determines that resonance will not occur if the conveying speed of the stepping motor 12 is set to the printing speed Vs1 using 2 phase excitation (NO in step S5). Upon determining that resonance will not occur (NO in step S5), the processor 5 sets the excitation mode of the stepping motor 12 to 2 phase excitation and sets the printing speed to Vs1 (step S6).

Meanwhile, upon determining that resonance will occur (YES in step S5), the processor 5 obtains a speed Va (an example of a second conveying speed) by reducing the printing speed Vs to a speed at which resonance will not occur when using 2 phase excitation (step S7). This speed Va is the fastest speed among those that are lower than the printing speed Vs1 and do not cause resonance when using 2 phase excitation, for example. As illustrated in FIG. 7, when the printing speed Vs is equal to the printing speed Vs1 and the vibration strength threshold value is equal to the threshold value RE1, a speed Va1 is obtained by decreasing from the printing speed Vs1 to a speed at which resonance will not occur when using 2 phase excitation.

Next, the processor 5 determines whether the torque of the stepping motor 12 when the conveying speed of the stepping motor 12 is set to the printing speed Vs using 1-2 phase excitation (an excitation mode different from 2 phase excitation) will be greater than or equal to a prescribed value (step S8). For example, as illustrated in FIG. 8, when the torque threshold value is equal to a threshold value T (such as 25 mNm), both the pull-out torque indicated by the dashed line and the pull-in torque indicated by the dot-dashed line for 1-2 phase excitation are greater than the threshold value T, and therefore the processor 5 determines that the torque of the stepping motor 12 will be greater than or equal to the prescribed value.

Upon determining that the torque will be less than the prescribed value (NO in step S8), the processor 5 changes the printing speed Vs to the speed Va obtained in step S7 as described above (step S9) and sets the excitation mode of the stepping motor 12 to 2 phase excitation (step S6).

Meanwhile, upon determining that the torque will be greater than or equal to the prescribed value (YES in step S8), the processor 5 determines whether resonance will occur in the stepping motor 12 when the conveying speed is set to the printing speed Vs using 1-2 phase excitation (step S10). This determination can be performed in a manner similar to the determination of whether resonance will occur when using 2 phase excitation as described above in step S5.

For example, as illustrated in FIG. 7, when the printing speed Vs is equal to the printing speed Vs2 and the vibration strength threshold value is equal to the threshold value RE2, the dashed line corresponding to 1-2 phase excitation indicates that at the printing speed Vs2, the vibration strength value is less than the threshold value RE2, and therefore the processor 5 determines that resonance will not occur (NO in step S10).

If it is determined that resonance will not occur at the printing speed Vs when using 1-2 phase excitation (NO in step S10), the processor 5 sets the printing speed to Vs and sets the excitation mode of the stepping motor 12 to 1-2 phase excitation (step S14).

Meanwhile, when the printing speed Vs is equal to the printing speed Vs1 and the vibration strength threshold value is equal to the threshold value RE1, the vibration strength value at the printing speed Vs1 when using 1-2 phase excitation is greater than the threshold value RE1, and therefore the processor 5 determines that resonance will occur (YES in step S10).

If it is determined that resonance will occur at the printing speed Vs when using 1-2 phase excitation (YES in step S10), the processor 5 reduces the printing speed Vs in order to obtain a speed Vb (an example of a third conveying speed) at which resonance will not occur and torque is greater than or equal to the prescribed value when using 1-2 phase excitation (step S11). This speed Vb is the fastest speed among those that are less than the printing speed Vs1 and do not cause resonance and also keep the torque greater than or equal to the prescribed value when using 1-2 phase excitation, for example. For example, as illustrated in FIG. 7, when the printing speed Vs is equal to the printing speed Vs1 and the vibration strength threshold value is equal to the threshold value RE1, a speed Vb1 is obtained by decreasing from the printing speed Vs1 to a speed at which resonance will not occur when using 1-2 phase excitation. Note that the reason why the processor 5 does not consider torque in the process of obtaining the speed Va for 2 phase excitation in step S7 as described above is because the torque (both the pull-out torque indicated by the solid line and the pull-in torque indicated by the dotted line) is greater than or equal to the prescribed value at all of printing speeds Vs that can be set when using 2 phase excitation. However, if printing speeds Vs at which the torque is less than the prescribed value can be set, both resonance and torque should be considered in the process of obtaining the speed Va for 2 phase excitation in step S7 as described above.

Next, the processor 5 compares the speed Va obtained in step S7 as described above to the speed Vb obtained in step S11 as described above and determines whether the speed Vb is greater than the speed Va (step S12).

For example, when the speed Vb1 is less than the speed Va1 as illustrated in FIG. 7, the processor 5 determines that the speed Vb is not greater than the speed Va (NO in step S12). If it is determined that the speed Vb is not greater than the speed Va (NO in step S12), the processor 5 changes the printing speed Vs to the speed Va (step S9) and then sets the excitation mode of the stepping motor 12 to 2 phase excitation (step S6).

Meanwhile, if it is determined that the speed Vb is greater than the speed Va (YES in step S12), the processor 5 changes the printing speed Vs to the speed Vb (step S13) and then sets the excitation mode of the stepping motor 12 to 1-2 phase excitation (step S14). Note that although in step S12 as described above the processor 5 performs the comparison/determination using just the speed Vb and the speed Va and then selects the excitation mode accordingly (steps S6 and S14), any approach may be used as long as the excitation mode is selected on the basis of at least the speed Vb and the speed Va. For example, in order to avoid frequent changes of the excitation mode, the excitation mode may be selected on the basis of a determination condition of whether the speed Vb is greater than the speed Va by at least a prescribed margin, or the vibration strength value and torque may be added as additional excitation mode selection conditions.

Figure 9A:
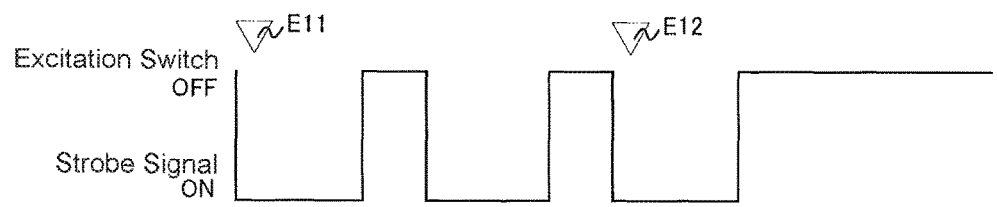
FIG. 9A is a timing chart for explaining a printing process for one printing line (with a printing count of three) when using 2 phase excitation.

After setting the excitation mode (steps S6 and S14), the processor 5 prints each printing line (step S15). FIG. 9A is a timing chart for explaining a printing process for one printing line (with a printing count of three) when using 2 phase excitation, and FIG. 9B is a timing chart for explaining a printing process for one printing line (with a printing count of three) when using 1-2 phase excitation.

Figure 9B:
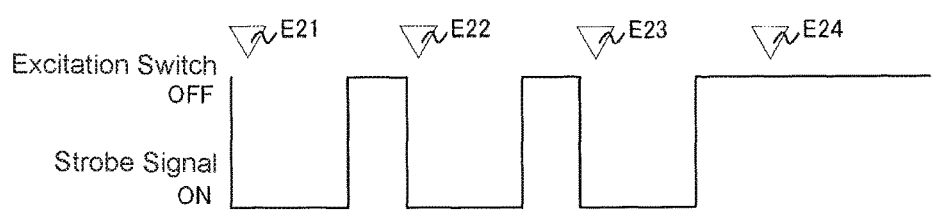
FIG. 9B is a timing chart for explaining a printing process for one printing line (with a printing count of three) when using 1-2 phase excitation.

In the examples illustrated in FIGS. 9A and 9B, the printing count is three, and therefore during a one-line period in which the printing medium M is conveyed by an amount equal to one printing line, there are three conducting periods in which the strobe signal is ON. Note that although the width (that is, the one-line period) of the timing chart for 2 phase excitation in FIG. 9A is slightly longer than the width of the timing chart for 1-2 phase excitation in FIG. 9B, this is only because in the examples illustrated in FIGS. 9A and 9B, the printing speed for 2 phase excitation is slightly slower than the printing speed for 1-2 phase excitation.

When using 2 phase excitation, there are two excitation switches E11 and E12 per printing line. Meanwhile, when using 1-2 phase excitation, there are four excitation switches E21, E22, E23, and E24 per printing line. This is because at a printing speed of 10 mm/s, for example, the number of pulses per second is 320 pps for 2 phase excitation but is 640 pps for 1-2 phase excitation. In other words, 1-2 phase excitation requires twice the number of pulses as 2 phase excitation to achieve the same speed, and therefore the number of excitation switches for 1-2 phase excitation is twice the number of excitation switches for 2 phase excitation.

Next, the processor 5 determines whether the printing line that was printed was the last line (step S16). If it is determined that this was the last line (YES in step S16), the processor 5 ends the process illustrated in FIG. 6. Meanwhile, if it is determined that this is not the last line (NO in step S16), the process is repeated starting from step S1 as described above.

Note that although in the description above the process of getting the printing speed Vs (step S3) and the process of setting the excitation mode (steps S6 and S14) were described as being performed for each and every printing line as an example, these processes do not necessarily have to be performed for each printing line. For example, the processes from the process of setting the printing speed Vs (step S4) to the process of setting the excitation mode (steps S6 and S14) may be performed at the same time as the process of getting the printing speed Vs (step S3). Moreover, in the description above, when it is determined that resonance will occur if 2 phase excitation is used (YES in step S5), both the process of determining whether resonance will occur if 1-2 phase excitation is used (step S10) and the process of determining whether the torque will be greater than or equal to the prescribed value when using 1-2 phase excitation (step S8) are performed. However, there are cases where when resonance occurs in one particular excitation mode, resonance is always much less likely to occur in the other excitation mode, an example of which is when using 2 phase excitation and 1-2 phase excitation. In those cases, particular, when resonance is determined to occur in a particular excitation mode, the other excitation mode may be selected without making judgements on resonance and torque for that other excitation mode. Furthermore, if it is known that the torques in these excitation modes are always greater than or equal to the prescribed value at all of the printing speeds Vs that can be set, the torque determination process (step S8) may be omitted.

In the present embodiment as described above, the printer 1 includes the stepping motor 12 (an example of a conveying motor) which operates in any of a plurality of excitation modes to convey the printing medium M, the thermal head 10 (an example of a printhead) which prints on the printing medium M on the basis of printing data, and the processor 5 which controls the stepping motor 12. Moreover, the processor 5 makes the stepping motor 12 operate in each of the plurality of excitation modes and sets which of the plurality of excitation modes to make the stepping motor 12 operate in on the basis of a strength value of vibration expected to occur in the stepping motor 12 when a conveying speed at which the printing medium M is conveyed is set to a first conveying speed (the printing speed Vs) that is set in accordance with the printing data.

Therefore, resonance which would occur at the obtained printing speed Vs can be avoided by changing from the excitation mode in which resonance would occur in the stepping motor 12 at the obtained printing speed Vs to another excitation mode. Thus, the present embodiment makes it possible to avoid the effects of resonance in a conveying motor (the stepping motor 12) while also reducing any decrease in printing speed relative to a desired value.

Moreover, in the present embodiment, the processor 5 estimates, on the basis of data representing a relationship between the conveying speed and the strength value of vibration which occurs in the stepping motor 12 for each of the plurality of excitation modes, the strength value of vibration that will occur in the stepping motor 12 when the conveying speed is set to the first conveying speed Vs in each of the plurality of excitation modes. This makes it possible to more reliably avoid the effects of resonance while also reducing any decrease in printing speed relative to a desired value.

Furthermore, in the present embodiment, the plurality of excitation modes include a first excitation mode (such as 2 phase excitation) and a second excitation mode (such as 1-2 phase excitation) which are different from one another. The processor 5 determines that resonance will occur in the stepping motor 12 if the strength value of vibration is greater than or equal to a threshold value and determines that resonance will not occur in the stepping motor 12 if the strength value of vibration is less than the threshold value. Upon determining that resonance will occur in the stepping motor 12 at the first conveying speed (such as the printing speed Vs) in the first excitation mode and determining that resonance will not occur in the stepping motor 12 at the first conveying speed in the second excitation mode, the processor 5 sets the stepping motor 12 to the first conveying speed while operating the stepping motor 12 in the second excitation mode. This makes it possible to set the excitation mode on the basis of the result of the determination of whether resonance will occur at the first conveying speed in the first excitation mode and in the second excitation mode.

In addition, in the present embodiment, the plurality of excitation modes include a first excitation mode (such as 2 phase excitation) and a second excitation mode (such as 1-2 phase excitation) which are different from one another. The processor 5 determines that resonance will occur in the stepping motor 12 if the strength value of vibration is greater than or equal to a threshold value and determines that resonance will not occur in the stepping motor 12 if the strength value of vibration is less than the threshold value. Upon determining that resonance will occur in the stepping motor 12 both at the first conveying speed (such as the printing speed Vs) in the first excitation mode and at the first conveying speed in the second excitation mode, the processor 5 obtains a conveying speed (such as the printing speed Va or Vb) which is lower than the first conveying speed and will not cause resonance to occur in at least one of the first excitation mode and the second excitation mode. This makes it possible to set a printing speed at which resonance will not occur.

Moreover, in the present embodiment, the processor 5 obtains a second conveying speed (such as the printing speed Va) which is lower than the first conveying speed (such as the printing speed Vs) and will not cause resonance to occur when the stepping motor 12 is operated in the first excitation mode (such as 2 phase excitation) and also obtains a third conveying speed (such as the printing speed Vb) which is less than the first conveying speed and will not cause resonance to occur when the stepping motor 12 is operated in the second excitation mode (such as 1-2 phase excitation), and the processor 5 then selects any one of the plurality of excitation modes on the basis of at least the second conveying speed and the third conveying speed. This makes it possible to set the excitation mode on the basis of a printing speed at which resonance will not occur.

Furthermore, in the present embodiment, the processor 5 further determines whether a torque of the stepping motor 12 will be greater than or equal to a prescribed value at the first conveying speed (such as the printing speed Vs) in the second excitation mode (such as 1-2 phase excitation). This makes it possible to set an excitation mode that will not cause resonance to occur and will not result in printing issues due to lack of torque.

Although embodiments of the present invention were described above, the invention of the present application includes all inventions within the scope of the claims and their equivalents.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A printer, comprising:
   a processor;
   a conveying motor that can operate in any one of a plurality of excitation modes, the conveying motor being configured to convey a printing medium; and
   a printhead that prints on the printing medium on the basis of printing data,
   wherein, with respect to each of at least some of the plurality of excitation modes, the processor determines a strength value of an undesired vibration caused by said conveying motor when the conveying motor is operated in said excitation mode, and selects one of the plurality of excitation modes of operating the conveying motor based on the determined strength values of the vibrations in the at least some of the plurality of excitation modes in actually printing on the printing medium.

2. The printer according to claim 1, wherein, with respect to each of said at least some of the plurality of excitation modes, the processor receives data representing a speed-vibration relationship between strength values of the vibration that are caused by the conveying motor operated in said excitation mode and conveying speeds that can be produced by the conveying motor, and determines the strength value of the vibration caused by said conveying motor when the conveying motor is operated in said excitation mode for each of the plurality of excitation modes by referring to said data representing the speed-vibration relationship.

3. The printer according to claim 2, further comprising a memory storing the data representing the speed-vibration relationship,
   wherein the processor reads out the data representing the speed-vibration relationship from the memory.

4. The printer according to claim 1,
   wherein the plurality of excitation modes include a first excitation mode and a second excitation mode that are different from each other,
   wherein, for each of the first and second excitation modes, the processor determines that resonance will occur among members constituting the conveying motor if the determined strength value of vibration is greater than or equal to a threshold value assigned to the excitation mode and determines that the resonance will not occur if the determined strength value of vibration is less than the threshold value, and
   wherein if the processor determines that the resonance will occur at a first conveying speed in the first excitation mode and if the processor determines that the resonance will not occur at the first conveying speed in the second excitation mode, the processor causes the conveying motor to operate in the second excitation mode at the first conveying speed.

5. The printer according to claim 1,
   wherein the plurality of excitation modes include a first excitation mode and a second excitation mode that are different from each other,
   wherein, for each of the first and second excitation modes, the processor determines that resonance will occur in the conveying motor if the determined strength value of vibration is greater than or equal to a threshold value assigned to the excitation mode and determines that resonance will not occur in the conveying motor if the determined strength value of vibration is less than the threshold value, and
   wherein if the processor determines that the resonance will occur at a first conveying speed in the first excitation mode and if the processor determines that the resonance will also occur at the first conveying speed in the second excitation mode, the processor determines another conveying speed that is lower than the first conveying speed and that does not cause the resonance in at least one of the first and second excitation modes, and causes the conveying motor to operate at the determined another conveying speed in said one of the first and second excitation modes.

6. The printer according to claim 5,
   wherein if the processor determines that the resonance will occur at the first conveying speed in the first excitation mode and if the processor determines that the resonance will also occur at the first conveying speed in the second excitation mode, the processor determines a second conveying speed that is lower than the first conveying speed and that does not cause the resonance in the first excitation modes and determines a third conveying speed that is lower than the first conveying speed and that does not cause the resonance in the second excitation mode, and
   wherein the processor selects one of the first and second excitation modes on the basis of at least the second conveying speed and the third conveying speed.

7. The printer according to claim 1,
   wherein the plurality of excitation modes includes a first excitation mode and a second excitation mode that are different from each other,
   wherein, for each of the first and second excitation modes, the processor determines that resonance will occur among members constituting the conveying motor if the determined strength value of vibration is greater than or equal to a threshold value assigned to the excitation mode and determines that the resonance will not occur if the determined strength value of vibration is less than the threshold value, and
   wherein if the processor determines that the resonance will occur at a first conveying speed in the first excitation mode and if the processor determines that the resonance will not occur at the first conveying speed in the second excitation mode and that a torque of the conveying motor will be greater than or equal to a prescribed value at the first conveying speed in the second excitation mode, the processor selects the second excitation mode and causes the conveying motor to operate in the second excitation mode at the first conveying speed.

8. The printer according to claim 1,
   wherein the plurality of excitation modes includes a default excitation mode, and
   wherein the processor first determines the strength value of the vibration at a first conveying speed in the default excitation mode, and if the strength value of the vibration is determined to be lower than a prescribed threshold, the processor selects the default excitation mode for actually operating the conveying motor and causes the conveying motor to operate in the default excitation mode at the first conveying speed without determining the strength value of the vibration in other excitation modes.

9. A method of controlling a printer performed by a processor in the printer, the printer including said processor;

a conveying motor that can operate in any one of a plurality of excitation modes, the conveying motor being configured to convey a printing medium; and a printhead that prints on the printing medium on the basis of printing data, the method comprising:
- with respect to each of at least some of the plurality of excitation modes, determining a strength value of an undesired vibration caused by said conveying motor when the conveying motor is operated in said excitation mode; and
- selecting one of the plurality of excitation modes of operating the conveying motor based on the determined strength values of the vibrations in the at least some of the plurality of excitation modes in actually printing on the printing medium.

10. A non-transitory computer-readable storage medium having stored thereon a program executable by a processor in a printer that includes said processor; a conveying motor that can operate in any one of a plurality of excitation modes, the conveying motor being configured to convey a printing medium; and a printhead that prints on the printing medium on the basis of printing data, the program causing the processor to execute the following:
- with respect to each of at least some of the plurality of excitation modes, determining a strength value of an undesired vibration caused by said conveying motor when the conveying motor is operated in said excitation mode; and
- selecting one of the plurality of excitation modes of operating the conveying motor based on the determined strength values of the vibrations in the at least some of the plurality of excitation modes in actually printing on the printing medium.

* * * * *